United States Patent [19]

Diwakar et al.

[11] Patent Number: 4,955,338
[45] Date of Patent: Sep. 11, 1990

[54] ENGINE AND HIGH TURBULENCE PISTON THEREFOR

[75] Inventors: Ramachandra Diwakar, Sterling Heights; Roger B. Krieger, Birmingham; Keith Meintjes, Grosse Points Farms; Edward G. Groff, Troy, all of Mich.

[73] Assignee: General Motors Corporation, Detroit, Mich.

[21] Appl. No.: 208,301

[22] Filed: Jun. 16, 1988

[51] Int. Cl.⁵ ............................................. F02B 23/06
[52] U.S. Cl. ...................................... 123/276; 123/279
[58] Field of Search .................... 123/276, 279, 193 P

[56] References Cited

U.S. PATENT DOCUMENTS

| | | | |
|---|---|---|---|
| 3,302,627 | 2/1967 | Morris | 123/276 |
| 3,945,351 | 3/1976 | Kimbara et al. | 123/276 |
| 4,083,330 | 4/1978 | Morris | 123/276 |
| 4,108,116 | 8/1978 | Ohta | 123/276 |
| 4,164,913 | 8/1979 | Komiyama et al. | 123/276 |
| 4,176,628 | 12/1979 | Kanai et al. | 123/276 |
| 4,177,769 | 12/1979 | Okada et al. | 123/276 |
| 4,207,843 | 6/1980 | List et al. | 123/276 |
| 4,538,566 | 9/1985 | Tsuruoka | 123/276 |
| 4,543,929 | 10/1985 | Kataoka et al. | 123/263 |
| 4,799,465 | 1/1989 | Yanagisawa et al. | 123/276 |
| 4,838,222 | 6/1989 | Yanagisawa et al. | 123/276 |

FOREIGN PATENT DOCUMENTS

| | | | |
|---|---|---|---|
| 63-105226 | 5/1988 | Japan | 123/279 |
| 94481 | 6/1960 | Netherlands | 123/276 |
| 769043 | 10/1980 | U.S.S.R. | 123/276 |
| 987134 | 1/1983 | U.S.S.R. | 123/276 |

*Primary Examiner*—Andrew M. Dolinar
*Attorney, Agent, or Firm*—Robert J. Outland

[57] ABSTRACT

A direct injection internal combustion engine of the diesel or spark ignition type is provided with a combustion bowl recess in the head end of the piston having both a polygonal lip and a polygonal bowl with upwardly and inwardly curving reentrant sides to provide high turbulence for fuel air mixing during an extended portion of the piston compression stroke and improved combustion of the air/fuel mixture.

9 Claims, 2 Drawing Sheets

ENGINE AND HIGH TURBULENCE PISTON THEREFOR

TECHNICAL FIELD

This invention relates to pistons for direct injection internal combustion engines such as diesel engines, direct injection stratified charge engines and the like. More particularly, the invention relates to squish promoting piston head configurations with high turbulence combustion chamber recesses.

BACKGROUND

It is known in the art relating to diesel engines to provide a high turbulence combustion chamber recess in the piston head for receiving the directly injected fuel charge and promoting mixing thereof with the cylinder air charge prior to ignition and burning. Numerous configurations for combustion chamber recesses in the piston heads of such engines have been utilized or proposed for obtaining various suggested advantages in mixing and combustion performance.

Beginning with the conventional axisymmetric, or circular, combustion bowl recess, variations have been proposed, including reentrant configurations having an overhanging lip of smaller diameter or lateral dimension than the body of the recess below. Other variations have included straight or angle sided square recesses, square reentrant recesses with a circular lip and various cusp-shaped configurations, among others. To applicants' knowledge, these variations have included rectangular lips with circular recesses and circular lips with rectangular recesses. Rectangular recesses with rectangular openings have also been proposed, but these appear to have been limited to straight sided recesses with parallel, or outwardly or inwardly sloping, sides.

SUMMARY OF THE INVENTION

The present invention resulted from the discovery through computations with a 3-dimensional computer simulation of the flow in a cylinder of a direct injection stratified charge spark ignition internal combustion engine which are also considered applicable to diesel engines and the like. It was found that non-axisymmetric bowl shapes, such as square or polygonal shapes, convert the swirl kinetic energy developed by the inflow of gases into a direct injection engine cylinder into turbulence more efficiently than do axisymmetric, or circular, bowl shapes. It was also learned that the lip of the bowl causes different effects on the flow than does the interior of the bowl. In brief, it was concluded that non-axisymmetric shapes interfere with the swirl in the cylinder, slowing it down and causing a restructuring of local pressures which results in shear that produces turbulence.

It was discovered that the configuration of the lip has its primary effect during the early stages of the compression stroke, during which time a square lip causes increased turbulence as compared with an axisymmetric, or circular, lip. Later in the compression stroke, near the top dead center position of the piston, the action of squish in the engine cylinder and the forcing of the cylinder charge largely into the piston bowl results in the shape of the bowl having the primary effect. Thus, a rectangular or polygonal reentrant bowl with upwardly and inwardly curved sides was shown to significantly increase turbulence in the late stages of the compression stroke as compared with an axisymmetric or similar bowl.

The present invention combines these teachings to provide a piston combustion bowl or recess configuration that promotes turbulence over a major portion of the compression stroke of a direct injection engine piston by providing a reentrant combustion chamber bowl recess with upwardly and inwardly curved sides and having, in combination, a square or polygonal lip with a larger dimension square or polygonal bowl below the lip. This combination is seen to provide increased turbulence for mixing directly injected fuel charges with air in the cylinder and combustion chamber recess during the entire compression stroke, as compared with other combustion chamber recess configurations known in the prior art. This is particularly desirable for spark ignition engines with direct injection of fuel early in the compression stroke but can also be effective in diesel and other late injection engines.

These and other features and advantages of the invention will be more fully understood from the following description of a preferred embodiment of the invention taken together with the accompanying drawings.

BRIEF DRAWING DESCRIPTION

DETAILED DESCRIPTION

Figure 1:
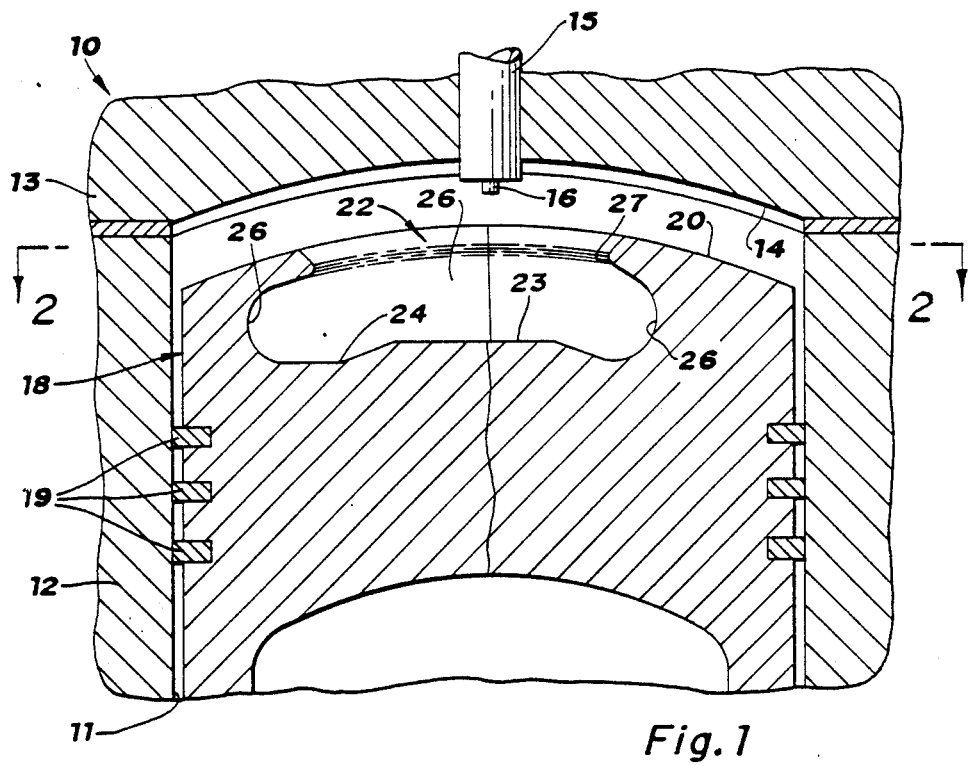
FIG. 1 is a cross-sectional view of the closed end portion of a single cylinder of a direct injection stratified charge internal combustion engine having a piston formed in accordance with the invention.

Referring now to the drawings in detail, numeral 10 generally indicates a direct injection stratified charge internal combustion engine having a plurality of cylinders 11, only one of which is shown, formed in the usual cylinder block 12. Each cylinder 11 is closed at its outer end by a cylinder head 13 having a curved, or dome-shaped, end wall 14 that defines the closed of the cylinder. A fuel nozzle or fuel injector 15 is mounted in the cylinder head, extending through the end wall centrally of the cylinder and having a spray tip 16 on the axis, not shown, of the cylinder to deliver atomized fuel charges into the cylinder closed end.

A piston 18 is reciprocably disposed within each cylinder 11 and includes the usual piston rings 19. The piston has a head end 20 which is domed in a curved configuration, similar to that of the cylinder end wall 14, for approaching to a position of close clearance with the end wall at the top dead center position of the piston, reached at the end of the compression stroke.

Figure 2:
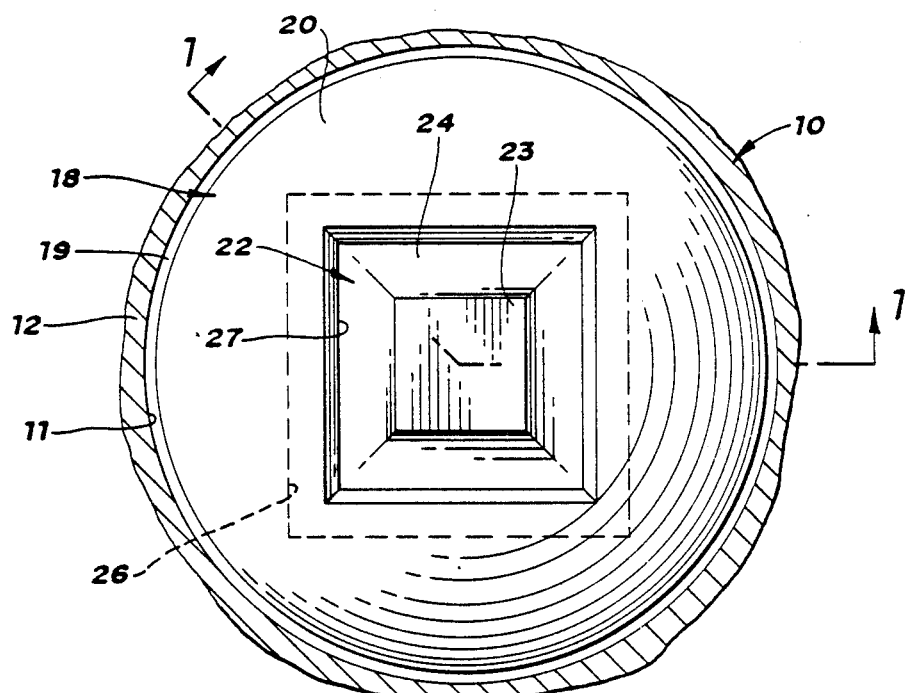
FIG. 2 is a view of the piston head from the plane indicated by the line 2—2 of FIG. 1.
Figure 3:
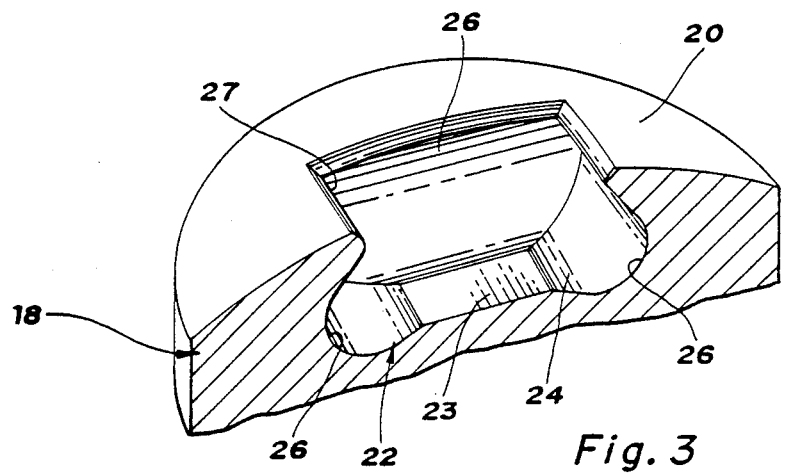
FIG. 3 is a pictorial cross-sectional view of the piston head and combustion chamber recess of the piston of FIGS. 1 and 2.

Centrally disposed on the axis, not shown, of the piston and cylinder, the piston head includes a piston bowl or combustion chamber recess generally indicated by numeral 22. The recess 22 is of essentially square configuration, as viewed axially as in FIG. 2, and includes a generally flat central bottom wall 23 surrounded by a peripheral bottom portion 24 sloping downwardly to a smooth junction with side walls 26 which curve upwardly and inwardly in essentially a U-shape to their junctions with a lip 27. The lip defines a square shaped opening through the head end 20 of the piston communicating the portion of the cylinder between the head end and the end wall 14 with the square combustion bowl defined by the bottom and side walls 23, 24 and 26.

The overall result is to define a square, or polygon shaped combustion chamber recess into which fuel is directly injected for turbulent mixing with an an air charge. The turbulence that causes such mixing is promoted in the early stages of the compression stroke by the square lip 27 and is further promoted in the late stages of the compression stroke by the square combustion bowl with the upwardly and inwardly curved reentrant side walls 26.

While the disclosed embodiment includes a cylinder end wall 14 and piston head end 20 having a domed shaped configuration, the use of flat end walls, or walls of other suitable configuration, is considered equally well within the scope of the invention. Similarly, the configuration of the flat central and peripherally downwardly sloping bottom wall is not believed to be critical but may be modified without departing from the intended scope of the invention. Further, while a centrally located piston bowl and injector are shown, piston bowls with centers offset from the cylinder axis and injector positions offset from the piston bowl center are not excluded from the intended scope of the invention.

The illustration of a square combustion chamber recess in the piston head end as a preferred embodiment of the invention, is not intended as a limitation thereof as it is considered that other polygonal shapes such as triangular, pentagonal or hexagonal could also be used in appropriate circumstances. Also, in general, non-square rectangular configurations or unequally sided polygonal configurations might also be utilized.

In preferred embodiments, it is contemplated that the polygonal configurations of the bowl and lip will each be essentially equilateral. A number of sides not exceeding six, and preferably four, is suggested for maximum turbulence enhancement. It is anticipated that the bowl and lip will preferably have polygonal sides of equal number and that lateral lines from the center to the corners of the polygonal bowl and lip portions will be longitudinally aligned as in the illustrated embodiment.

Figure 4:
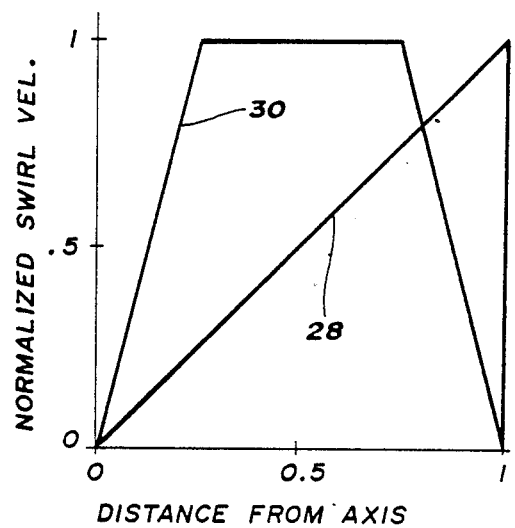
FIG. 4 is a graphical illustration of the reordering of swirl velocity distribution within the cylinder effected by the polygonal bowl and lip configuration of the present invention.

FIG. 4 graphically illustrates the effect of the polygonal combustion chamber recess of the present invention on the swirl velocity distribution within an engine cylinder having substantial swirl of the intake charge. Line 28 illustrates the effective increase in swirl velocity, from the axis of the cylinder at "0" to the periphery thereof at "1" on the horizontal scale, which is caused by the centrifugal force effect on the swirling charge delivered to the cylinder. The interference with swirl produced by the polygonal lip and bowl of the present invention slows down the swirl and redistributes the swirl velocity within the cylinder along the lines of the flat topped curve 30. The resulting change in swirl velocity distribution is believed to result in substantial shear effects which produce the high degree of turbulence developed in the combustion chamber and cylinder by the high turbulence configuration of the present invention.

It should also be noted that the corners of the polygonal portions of the combustion chamber recess (i.e. the lip and bowl) need not be sharply angled as illustrated in the drawings, but may be radiused or curved as required to provide for ease of manufacture and reduction of stresses without departing from the intent of the invention.

While the invention has been described by reference to certain preferred embodiments, it should be understood that numerous changes could be made within the spirit and scope of the inventive concepts described. Accordingly it is intended that the invention not be limited to the illustrated or described embodiment, but that it have the full scope permitted by the language of the following claims.

The embodiments of the invention in which an exclusive property or privilege is claimed are defined as follows:

1. An internal combustion engine comprising
   a cylinder closed at one end,
   a piston reciprocable in the cylinder and having a head end opposing the cylinder closed end, the piston defining with the cylinder a variable volume working chamber, said piston having a reentrant polygon shaped combustion chamber bowl having a bottom with an outer portion that joins with essentially U-shaped side walls smoothly and exclusively connecting the bottom of the polygonal bowl with a polygonal lip located in the head end and defining an opening toward the cylinder closed end, and
   direct fuel injection means mounted in the cylinder closed end opposite the combustion chamber bowl and adapted to direct a fuel spray into the open combustion chamber.

2. An internal combustion engine comprising
   a cylinder closed at one end,
   a piston reciprocable in the cylinder and having a head end opposing the cylinder closed end, said piston defining with the cylinder a variable volume working chamber, said piston having a combustion chamber defining recess in the head end and opening toward the cylinder closed end, and
   direct fuel injection means mounted in the cylinder closed end opposite the combustion chamber recess and adapted to direct a fuel spray into the open combustion chamber,
   wherein the combustion chamber recess includes
   essentially U-shaped side walls smoothly and exclusively connecting
   a generally polygonal lip in the head end with
   a bottom portion of a generally polygonal bowl under the lip, the bowl being generally of greater lateral dimensions than the lip to thereby provide a reentrant combustion chamber recess with polygonal bowl and lip.

3. A piston as in claim 2 wherein the bowl and lip have polygonal sides of equal number and lateral lines from the corners to the center of the generally polygonal portions are longitudinally aligned.

4. A piston as in claim 3 wherein the polygonal configurations of the bowl and lip are each essentially equilateral and have a number of sides not exceeding six.

5. A piston as in claim 4 wherein both the bowl and lip have four sides which are essentially straight' as viewed axially.

6. An engine piston having a reentrant combustion chamber recess with essentially U-shaped side walls smoothly and exclusively connecting a bottom portion of a polygonal bowl with a polygonal lip opening to the piston exterior.

7. An engine piston as in claim 6 wherein the bowl and lip have polygonal sides of equal number and lateral lines from the center to the corners of the polygonal portions are longitudinally aligned.

8. An engine piston as in claim 7 wherein the polygonal configurations of the bowl and lip are each equilateral with a number of sides not exceeding six.

9. An engine piston as in claim 8 wherein both the bowl and lip have four sides.

* * * * *